United States Patent [19]

Saitoh

[11] Patent Number: 4,808,454

[45] Date of Patent: Feb. 28, 1989

[54] ACTIVE AGENT-CONTAINING LAMINATED MATERIAL

[75] Inventor: Hachiro Saitoh, Yokosuka, Japan

[73] Assignee: Nippon Petrochemicals Company, Limited, Tokyo, Japan

[21] Appl. No.: 908,108

[22] Filed: Sep. 16, 1986

[51] Int. Cl.⁴ .................. A61L 9/04; B32B 31/00; B32B 27/08

[52] U.S. Cl. ........................ 428/42; 428/41; 428/343; 428/476.1; 428/483; 428/463; 428/461; 428/509; 428/510; 428/516; 428/518; 428/905; 428/520; 156/280; 156/244.11; 264/176.1; 514/953; 514/974; 514/875; 514/919; 514/920

[58] Field of Search ............... 428/905, 516, 518, 520, 428/461, 463, 42, 483, 41, 476.1, 43, 509, 510

[56] References Cited

U.S. PATENT DOCUMENTS

| | | | |
|---|---|---|---|
| 4,145,001 | 3/1979 | Weyenberg et al. | 428/905 X |
| 4,391,717 | 7/1983 | Mookherjee | 428/905 X |
| 4,631,231 | 12/1986 | Steiydel et al. | 428/905 X |

FOREIGN PATENT DOCUMENTS

| | | | |
|---|---|---|---|
| 2801636 | 7/1979 | Fed. Rep. of Germany | 428/905 |
| 0070373 | 6/1979 | Japan | 428/905 |
| 0140160 | 8/1982 | Japan | 428/43 |
| 3042 | of 1871 | United Kingdom | 428/43 |

*Primary Examiner*—P. C. Ives
*Attorney, Agent, or Firm*—Scully, Scott, Murphy & Presser

[57] ABSTRACT

An active agent-containing laminated material and the method for producing the same, in which an impermeable film is temporarily adhered to at least one side surface of an active agent-containing film and impermeable film can be peeled off and readhered repeatedly. The laminated material is prepared by directly laminating a molten web of active agent-containing polyolefin composition with an impermeable film at and pressing them together, said active agent-containing polyolefin composition comprising: (A) 10 to 100 parts by weight to carboxyl group-containing ethylene based copolymer of at least 7% by weight in the content of carboxyl group-containing monomer; (B) 90 parts by weight or less of low density polyethylene having a melt index of at least 30 g/10 min.; and (C) at least 0.005 parts by weight of an active agent or agents relative to 100 parts by weight of said polymers (A) plus (B).

13 Claims, No Drawings

ACTIVE AGENT-CONTAINING LAMINATED MATERIAL

BACKGROUND OF THE INVENTION (1) Field of the Invention

This invention relates to an active agent-containing laminated material and a method for producing the same. More particularly, the invention relates to an active agent-containing laminated material and a method for producing the same in which impermeable films are temporarily laminated to the surfaces of an active agent-containing film and the effect of an active agent is produced only by peeling off at least one of the impermeable films.

(2) Description of the Prior Art

In the conventional art, perfumes, antifungal agents, rust inhibitors, insecticides, repellents and the like (hereinafter referred to as "active agents"), especially volatile ones, are generally used in the forms of powder, tablets or solutions in water or alcohol. In the case of a solution, paper or cloth is coated or impregnated with the solution to obtain fragrant paper, rust inhibitive paper and so forth.

There have been, however, several problems in that the effect of an active agent is liable to be lost in a short period of time and the heat-sealable property and waterproofness of the active agent-containing materials are not satisfactory. Meanwhile, several polyolefin compositions are proposed which are prepared by mixing active agents into plastics such as polyolefin by using carriers so as to regulate the rate of releasing of the active agents to be slow and constant.

For example, in British Pat. No. 1,538,085, it is proposed that a master batch of perfume-containing ethylene-vinylacetate copolymer is blended into polyethylene to obtain a composition and this composition is used for refuse bags and so forth.

Similar examples are disclosed in many patent specifications such as U.S. Pat. No. 4,095,031 (Japanese Laid-Open Patent Publication No. 53-98352); Canadian Pat. No. 844,014; U.S. Pat. No. 3,553,296; and Japanese Laid-Open Patent Publication No. 56-121560. These compositions are used singly or in combination with other plastics to form film materials and injection molded goods.

In order to avoid undesirable release of active agents before use and to prolong the serviceable life of active agents, it is desirable that these products are hermetically sealed with impermeable wrapping materials until they are used.

Meanwhile, in the present status of the industry, there are few instances of laminated materials that are made of the combination of a composition of active agents such as perfume and polyolefin with a substrate material made of other plastics of paper.

In the field of volatile rust inhibitors, a few patents are known as an inevitable consequence of the manner of uses (U.S. Pat. No. 282,980; U.S. Pat. No. 3,080,211 and Japanese Patent Publication No. 52-13988). The laminated materials described in these patents are produced by steps such that a volatile rust inhibitor is dissolved in an emulsion resin or a solvent and applied to a film to obtain a covering film and the covering film is laminated with a base film, or a plastic layer containing a rust inhibitor is bonded firmly to a base film. These are used in direct contact with metallic goods in order to prevent the goods from gathering rust.

Perfumes are used not only for cosmetics, soaps, detergents, tooth pastes, medicines, bath agents, cakes, chewing gum, alcoholic liquors and refreshing beverages but, with the recent changes in life style, fragrences are utilized in a variety of ways to make the daily mode of life more comfortable and enjoyable.

In order to meet the above requirement, the inventors have proposed posters, postcards, bookmarkers, labels, greeting cards, interior wall materials and packaging materials that are made of laminated materials of a perfume-containing polyolefin composition and a substrate material such as paper.

These laminated materials are those prepared by firmly bonding active agent-containing polyolefin compositions to substrate materials like the foregoing rust inhibitive laminates. Therefore, it is necessary that the laminated materials are hermetically sealed with impermeable films in order to prevent the active agents from being released before use.

To this end, it is desirable that the outsides of these laminated materials be covered by films. For this purpose, the covering film must be temporarily applied to the laminated material and, in addition, it is desirable that the covering film can be reapplied after it has been peeled off.

In order to meet the above requirement, when an adhesive agent is used, it remains on the substrate material leaving a sticky surface. Where the active agent is a perfume, the fragrance of the perfume will be degenerated.

Static electricity was utilized as an adhesive means to secure the covering film. Since this temporary adhesive force had to be weak enough to permit removal of the film, it was difficult to completely seal off the fragrance when the covering film was reapplied.

BRIEF SUMMARY OF THE INVENTION

It is, therefore, the primary object of the present invention to provide an active agent-containing laminated material which is characterized in that, when impermeable films are temporarily applied, the fragrance or vapor of an active agent can be completely sealed up, and when at least one of the impermeable films, which is temporarily applied using no adhesive agent, is peeled off, the effect of the active agent is produced, and the adhesive property is not reduced in spite of repeated "peeling and reapplying", that is the impermeable film can be readhered only by finger tip pressure.

A second object of the present invention is to provide a method for producing an active agent-containing laminated material which is characterized in that the process of the method is simplified and can be carried out without difficulty and that the undesirable release by evaporation and thermal deterioration of the active agent and the thermal deterioration of plastic materials in the production process can be successfully avoided.

In accordance with the present invention, the laminated material is composed of at least an active agent-containing polyolefin film and an impermeable film, and it is produced by directly putting a molten web of an active agent-containing polyolefin composition on a impermeable film and pressing them together. The active agent-containing polyolefin composition comprises:

(A) 10 to 100 parts by weight of carboxyl group-containing ethylene based copolymer of at least 7% by weight in the content of carboxyl group-containing monomer;

(B) 90 parts by weight of less of low density polyethylene having a melt index of at least 30 g/10 min.; and (C) at least 0.005 parts by weight of an active agent or agents relative to 100 parts by weight of said polymers (A) plus (B).

DETAILED DESCRIPTION OF THE INVENTION

The carboxyl group-containing ethylene based copolymers of (A) component in the present invention are the copolymers which are prepared by copolymerizing ethylene with carboxyl group containing monomers and which copolymers are exemplified by ethylene-vinyl ester copolymers such as ethylene-vinyl acetate copolymer; ethylene-carboxylic acid copolymers or ethylene-carboxylic ester copolymers such as ethylene-acrylic acid copolymer, ethylene-methacrylic acid copolymer, ethylene-ethyl acrylate copolymer and ethylene-ethyl methacrylate copolymer. Further, also included in the carboxyl group-containing ethylene based copolymers of (A) component are modified ethylene based polymers which are prepared by adding or grafting unsaturated carboxylic acids such as acrylic acid, methacrylic acid, maleic acid, its anhydride and fumaric acid or their esters to ethylene based polymers.

It is necessary that the content of the carboxyl group-containing monomer in the above carboxyl group-containing ethylene based copolymer is at least 7% by weight. The preferable range of the content is 10 to 50% by weight. When the content of carboxyl group-containing monomer is less than 7% by weight, the temporarily adhesive property in repeated peeling and readhering is not sufficient, in addition, practical value will be lost because sufficient quantity of active agent can not be contained.

Among the above carboxyl group-containing ethylene based copolymers, ethylene-vinyl acetate copolymer and ethylene-ethyl acrylate copolymer are preferable.

The low density polyethylene as the component (B) in the present invention includes high-pressure low density polyethylene and the copolymers of ethylene with α-olefins such as propylene, butene-1,4-methylpentene-1 and hexene-1. The densities of them are in the range of 0.860 to 0.945 g/cm$^3$ and preferably 0.900 to 935 g/cm$^3$. The melt index (hereinafter referred to as "MI") of the low density polyethylene is at least 30 g/10 min. or more and preferably in the range of 35 to 200 g/10 min.

In the case that the value of MI is less than 30 g/10 min., it is difficult to seal up the "fragrance" of a perfume after the impermeable film is once peeled off and readhered. In addition, the below-described advantage in low temperature lamination and the avoiding of film breakage in high rate lamination cannot be expected.

The compounding ratio of the above component (A) and component (B) is: A/B=10-100/90-0. That is, only the component (A) can be used singly, however, by compounding the component (B), the advantages can be obtained that the controlling of temporary adherence in reapplying becomes easy and the fear of breakage in high rate lamination can be avoided.

The active agents as the component (C) in the present invention are perfumes, deodorants, antifungal agents, germicides, repellents, insecticides, rodenticides, rust inhibitors, antiseptic agents, and antifouling agents.

Perfumes, which may also be called fragrances, are divided into two groups of natural perfumes and artificial perfumes. The natural perfumes are exemplified by animal perfumes of musk, civet, castreum and ambergris and vegetable perfumes consisting of essential oils such as lavender oil, peppermint oil, lemon oil, orange oil, rose oil, camphor oil, sandalwood oil, and hinoki oil.

The artificial perfumes are exemplified by synthetic perfumes such as terpene compounds and aromatic compounds, isolated perfumes derived by fractional distillation from essential oils, and other various isolated perfumes, and formulated perfumes prepared by mixing synthetic perfumes and natural perfumes in view of practical applications. At least one of them is used in the method of the present invention.

Other active agents are further exemplified by deodorants such as "Fresh Shiraimatsu" (trademark, made by Shiraimatsu Shin'yaku Co., Ltd.), "Biodash" (trademark, made by Osaka Soda Co., Ltd.; Tokyo Seikagaku Kenkyusho Co., Ltd.), "Anico" (trademark, made by Minato Sangyo Co., Ltd.); antifungal agents such as thiabendazole, vinazine and α-brome cinnam aldehyde; germicides such as alcohols, formalin, salicylic cid, creosote, phenol, nitrofurazone, and nitrofurylacrylic acid amide; insect repellents such as p-menthane derivatives and citronella oil; pyrethroids such as natural pyrethrin, and synthetic pyrethrin-like compounds such as "Pinamine", "Permethorine", "Vaporthrin" (all trademarks, made by Sumitomo Chemical Co., Ltd.); insecticides such as DDT, BHC, drine-agents, parathion, DDVP, and PGP; rodenticides such as "Naramycin" (trademark, made by Tanabe Seiyaku Co., Ltd.), "Ramtarine" (trademark, made by Matsushita Electric Works Co., Ltd., "Kotomycin" (trademark, made by Osaka Kasei Co., Ltd.); repellents for dogs and cats such as lemongrass oil and tar of tobacco; volatile rust inhibitors of organic amine salts such as cyclohexylammonium nitrite and heterocyclic amines such as benzotriazole and methylbenzotriazole; antiseptic agents for foodstuffs such as sorbic acid and dehydroacetic acid; and antifouling agents such as phenylmercuric acetate, phenylmercuric oleate, copper naphthanate and copper oleate. These active agents can be used singly or in combination of two or more kinds in accordance with the purpose and utility.

The compounding ratio of the above active agents is at least 0.005 parts by weight relative to 100 parts by weight of the polymer components. If the compounding ratio is less than 0.005 parts by weight, the product obtained is not practical because the effect of active agent is too small.

The materials for the impermeable film of the the present invention are polyamides, polyvinylidene chloride, polyvinyl chloride, saponified product of ethylene-vinyl acetate copolymer, polyester, regenerated cellulose, metal foil and metallized film. Among these impermeable films, transparent films are preferable.

It is important that the laminated material of the present invention is the one which is prepared by directly laminating the foregoing molten web of active agent-containing polyolefin composition and impermeable film, and pressing together.

Even though the precise reason why the temporary adhesive force of the laminated material is not significantly reduced despite of repeated "peeling and readhering" is not clear, it is contemplated as follows: Because of the interaction the ethylene-vinyl acetate copolymer, the specific low density polyethylene and the setting temperature of the molten web specific to the contained active agent; appropriate surface tension is produced between laminated layers and the temporary adhesive force can be maintained.

Incidentally, even if a film or sheet of active agent-containing composition is previously formed and it is stuck to an impermeable film, the temporary adhesive force like that of the present invention cannot be expected.

However, it is desirable that the impermeable peeling off film used in the present invention is a film of low surface activity without applying any pretreatment such as anchor treatment and be a film of less than 30 dyne/cm$^2$ in surface tension.

Exemplary layer constituents of the laminated material according to the present invention are given in the following:

(1) A laminated material (a/b) consisting of 2 layers of an active agent-containing polyolefin film (a) and an impermeable film (b);

(2) A laminated material (b/a/b') consisting of 3 layers where an active agent-containing polyolefin film (a) is interposed between 2 sheets of impermeable films (b) and (b');

(3) A laminated material (b/c/a/b') which is formed by laminating a polyolefin film (c) to an impermeable film (b) to obtain an impermeable film (b/c) and, between the side of the polyolefin layer (c) and another impermeable film (b'), an active agent-containing polyolefin film (a) is interposed.

(4) A laminated material (b/c/a/c/b') which is formed by laminating a polyolefin film (c) to an impermeable film (b) and (b'), respectively, to obtain an impermeable film (b/c) and (b'/c) and, between the polyolefin sides of these impermeable film (b/c) and (b'/c), an active agent-containing polyolefin film (a) is interposed.

In variations of the above laminated materials, a transparent impermeable film, printed paper and several other films may be combined with the laminated material.

As described above like the one in Paragraph (2), the effect of an active agent can be produced from both sides of the film of active agent-containing polyolefin composition by peeling off both covering impermeable films.

Furthermore, the laminated material of the present invention can be formed using opaque plastic films or metal foils in place of plastic films. In the case that the laminated material is a transparent one, it can be laminated on, for example, a poster to provide a fragrant and glossy poster which is higher in commercial value. When perforations are previously formed in the impermeable film to be peeled off later, it is possible to peel off the film partially so as to control the strength of or effective time length of an active agent.

In typical examples, when the active agent is a perfume or a deodorant, posters for cosmetics, a poster having enjoyable sylvan air and a deodorant poster; samples such as perfume samples; and packaging materials having fragrances in conformity with goods to be packed, are produced. When the active agent is an insecticide or insect repellent, the laminated material can be used for exterminating noxious insects such as mosquitoes, flies and ticks in home or those in farmlands.

When an adhesive agent is applied to non-peelable impermeable films, the laminated materials of the invention can be used as fragrant labels, deodorant labels, animal repellent labels for dogs, cats and birds, and rodenticide labels.

In the case that backing paper containing an antifungal agent, antiseptic an agent or a rust inhibitor, is hermetically packed together with goods to be preserved, the impermeable film can be made of an opaque film. In the case of a cat repellent label, rodenticide label and mosquito repellent label, the impermeable film can be opaque one.

The second invention provides a method for producing active agent-containing laminated material which is simplified and be carried out easily. Furthermore, the thermal deterioration and undesirable releasing by evaporation of active agents and the thermal deterioration of polymers in the production process can be successfully avoided. Still further, repeated "peeling and re-sticking" of the impermeable film of laminated material is possible.

The method for producing the active agent-containing laminated material according to the present invention comprises the steps of directly putting a molten web of an active agent-containing polyolefin composition on a impermeable film, the temperatures of said molten web being in the range from the melting point of said composition to a temperature higher than said melting point by 100° C., and then pressing them together. As described above, the active agent-containing polyolefin composition consists of:

(A) 10 to 100 parts by weight of carboxyl group-containing ethylene based copolymer of at least 7% by weight in the content of carboxyl group-containing monomer;

(B) 90 parts by weight or less of low density polyethylene having a melt index of at least 30 g/10 min.; and (C) at least 0.005 parts by weight of an active agent or active agents relative to 100 parts by weight of said polymers (A) plus (B).

The characteristic feature of the present invention resides in the fact that a molten web of the polyolefin composition consisting of a specific carboxyl group-containing ethylene based copolymer (A) of relatively higher content of carboxyl group-containing monomer as 7% by weight or more, a specific low density polyethylene (B) having a melt index of at least 30 g/10 min. and an active agent or agents, is directly laminated with an impermeable film of low surface activity, in a specific temperature range. The molten web is desirably an extruded molten web.

As a typical method for producing laminated materials, there is known a method of lamination by extrusion coating.

In this method, several kinds of substrate materials of papers such as quality paper or kraft paper, plastic films, regenerated cellulose film and metal foils are coated by molten polyethylene by extrusion lamination, thereby producing various kinds of wrapping or packaging materials and so forth utilizing the advantageous properties of the combination of a substrate material and a plastic material, such as water-proofness, moisture-proofness, chemical resistance, softness, heat-sealable property, etc.

The adhesive bonding mechanisms in the above lamination process are classified into mechanical adhesive bonding and chemical adhesive bonding. The former mechanical adhesive bonding is applied to porous substrate materials such as cloth and paper, in which the molten polymer extruded at a high temperature infiltrates into fine pores among the fibers and is then solidified by cooling providing adhesive bonding between a plastic material and a substrate material.

The latter chemical adhesive bonding utilizes the chemical intermolecular force and it is applied to the materials having smooth surfaces such as regenerated cellulose film, aluminum foil and plastic films or those having no functional groups. In order to obtain satisfactory bonding force in the chemical adhesive bonding, it is necessary that the substrate material is subjected to primer treatment, and it is often treated by corona discharge.

Meanwhile, the polyethylene used for extrusion coating is activated. As the method for this activation, it is a general practice that polyethylene is extruded at higher temperatures so as to increase oxygen-containing polar groups (carbonyl groups) in molecules before it is brought into contact with a substrate material so as to provide sufficient adhesive strength.

In the former mechanical adhesive bonding, when the temperature of molten polymer is high, the viscosity of the polymer is lowered to improve the infiltration into a substrate material and the adhesive strength is also improved. Therefore, the lamination is done at sufficiently high temperatures so that the polymer is not decomposed. Accordingly, low density polyethylene is generally melted and kneaded by being heated to, at the lowest, 280° to 310° C. in the conventional lamination process. In this process, it is necessary that the polyethylene is not decomposed and does not give out any offensive odor. In the industrial practice, however, partial decomposition occurs the emission of an irritating smell from the decomposed product, and much smoke is emitted during the processing. Thus the polyethylene suffers from serious thermal deterioration.

As described above, in the conventional lamination method, it was a problem that the thermal deterioration of polyolefin and the releasing, thermal degeneration and thermal decomposition of active agents were liable to occur.

Furthermore, even when the conventional lamination method is carried out at a lower temperature to produce a laminated material of low interlayer peeling strength without causing any release and thermal deterioration of active agents, if a layer is peeled off from the laminated material obtained, the layer cannot be readhered, which has no temporary sticking property like the laminated material according to the present invention, and which is poor in utility.

The laminated material of the present invention which has temporary sticking property when it is readhered, can only be produced by selecting the foregoing specific active agent-containing polyolefin composition, specific substrate material and specific laminating conditions.

It is desirable for avoiding the releasing, deterioration and thermal decomposition of the active agents that the active agent-containing polyolefin composition is prepared by dry-blending low density polyethylene with the composition which is prepared by previously impregnating a certain quantity of active agents into carboxyl group-containing ethylene based copolymer (A) such as ethylene-vinyl acetate copolymer (EVA) or ethylene-ethyl acrylate copolymer (EEA).

Furthermore, in the present invention, it is possible to use permeable films and/or impermeable films such as printed paper, plastic films and metal foils that are prepared by extrusion lamination of polyolefin.

That is, the present inventors have proposed in Japanese Patent Application No. 60-210435 that an active agent-containing polyolefin composition can be laminated to the side of polyolefin of paper or plastic film which is previously laminated with polyolefin under specific low temperature condition and specific laminating method, to produce a laminated material having strong interlayer peeling strength.

Accordingly, by previously preparing laminated material using printed paper or films and polyolefin, it can be made possible to laminate easily the printed material with active agent-containing polyolefin composition.

The polyolefins used in the method of the present invention are low density, medium density and high density ethylene homopolymers; copolymers of ethylene as the main component with α-olefins such as ethylene-propylene copolymer, ethylene-butene-1 copolymer, ethylene-hexene-1 copolymer, ethylene-4-methylpentene-1 copolymer, ethylene-octene-1 copolymer; carboxyl group-containing ethylene based copolymers such as ethylene with vinyl acetate and ethylene with acrylic ester; propylene homopolymer; copolymers of propylene as the main component with other α-olefins; butene-1 homopolymer; poly-4-methylpentene-1; modified polyolefins prepared by reacting the above polyolefins with unsaturated carboxylic acids such as maleic acid, its anhydride or their derivatives; and the mixtures of the above polymers.

As the method for preparing the laminated material of the present invention, the extrusion lamination method is most preferable.

By using the above method, the laminated material can be produce continuously through a simplified process at a higher production rate.

As described above, the laminated material of the present invention is prepared by laminating a specific active agent-containing polyolefin composition and specific substrate material under specific low temperature conditions. Therefore, in spite of repeated "peeling and readhered" without using any adhesive agent, the temporary adherent property is not lost and the active agent can be completely sealed up when the laminated material is not used.

Furthermore, because the release of active agents, thermal degeneration, thermal decomposition and deterioration of plastic material can be prevented, and the production process can be carried out continuously at a high production rate through a simplified process, the laminated material of the invention can be produced at low cost.

The present invention will be described in more detail with reference to several examples.

EXAMPLES 1-3

Comparative Examples 1-4

As shown in the following Table 1, perfume-containing polyolefin compositions were prepared by impregnating several kinds of EVA with a perfume, limonene (made by T. Hasegawa Co., Ltd.) and blending various low density polyethylene (LDPE) to the obtained mixtures.

By the ordinary method, a 12 micron thick polyethylene terephthalate (PET) film (trademark: #E5100, made by Toyobo Co., Ltd.) was laminated at 300° C. with extruded 15 micron thick LDPE of MI: 5 and density: 0.919. The above compositions were extruded at prescribed temperatures into the space between the above laminated PET film (27 micron thick) and another non-laminated PET film (12 micron thick), and they were put in layers and pressed together to obtain specimens of Examples 1 to 3 and Comparative Examples of 1 to 4.

In the process, the breakage of extruded molten web, odor at a point near the molten web, adhesive strength between the composition layer and the laminated PET layer and temporary adhesive strength (shown by the average values of 5 times' "peeling and readhered") between the composition layer and the non-laminated PET layer, and the degeneration and strength of the odor after peeling off the non-laminated PET film, were observed. The results are shown in Table 1.

As clearly understood from the results of Examples and Comparativ Examples, in the case of the composition containing no LDPE, if VA % is low, temporary adhesive strength is insufficient and odor is quite weak.

Even in the composition containing LDPE, if the MI value is low, film breakage is caused to occur and the adhesive strength and temporary adhesive strength are insufficient. The film breakage can be prevented by raising the extrusion temperature, however, the limonene in the molten web is decomposed to produce irritating odor, and accordingly, the odor of the laminated material is degenerated and its serviceable time is shortened. Furthermore, if the EVA content is low, the temporary adhesive force is insufficient and the serviceable time is also short. In addition, if the vinyl acetate content (VA %) in EVA is low, it is impossible to impregnate a large quantity of limonene.

rin, made by Sumitomo Chemical Co., Ltd.) in place of the limonene in Example 2.

This laminated material was left as it was prepared but no effect as repellent was observed.

Non-laminated PET film was peeled from this laminated material without any large resisting force and it was left in that condition. As a result, the effects as insecticide and insect repellent were observed with respect to ants, mosquitoes and ticks.

EXAMPLE 5

Using an antifungal agent of α-brome cinnam aldehyde made by Shoka Yakuhin Co., Ltd. in place of the limonene in Example 3, the powder was mixed with pellets of EVA and LDPE. The mixture was extruded to obtain a laminated material of Example 5.

The laminated material was put into a bag together with a loaf of bread and kept in that condition. However, no anti-fungal effect was observed.

Non-laminated PET film was peeled from this laminated material without any large resisting force and the fungicide-containing polyolefin layer was placed inside a bag. A loaf of bread was put into this bag and, after 75 days, no mold was observed over the bread.

What is claimed is:

1. An active agent-containing laminated material which is prepared by
   (1) laminating the polyolefin side of a first impermeable film, said first impermeable film having been previously laminated with a polyolefin film, to one side of a molten web of active agent-containing polyolefin composition,
   (2) laminating a second impermeable film, having no polyolefin film laminated thereto, to the other side of said molten web of active agent-containing polyolefin composition, said second impermeable film being capable of being repeatedly peeled off and readhered to the web of active agent-containing

TABLE 1

|  | Examples | | | | | | |
| --- | --- | --- | --- | --- | --- | --- | --- |
|  | Example | | | Comparative Example | | | |
| Items | 1 | 2 | 3 | 1 | 2 | 3 | 4 |
| EVA | | | | | | | |
| VA % | 10 | 20 | 20 | 5 | 20 | 20 | 20 |
| wt % | 95 | 20 | 20 | 95 | 3 | 20 | 20 |
| LDPE | | | | | | | |
| MI | — | 40 | 40 | — | 40 | 15 | 15 |
| wt % | 0 | 75 | 79 | 0 | 92 | 75 | 75 |
| Limonene | | | | | | | |
| wt % | 5 | 5 | 1 | 5 | 5 | 5 | 5 |
| Max wt % (*1) | 25 | 59 | 59 | 17 | 59 | 59 | 59 |
| Molten Web | | | | | | | |
| Temp. °C. | 170 | 180 | 180 | 175 | 180 | 180 | 180 |
| Film Breakage | No | No | No | No | No | Yes | No |
| Odor (*2) | Mod | Mod | Mod | Mod | Mod | Mod | IOd |
| Adhesive Strength I (kg/15 mm, *3) | 1.5 | 1.7 | 1.7 | 1.2 | 1.0 | 0.05 | 2.0 |
| Adhesive Strength II (kg/15 mm, *4) | 0.2 | 0.2 | 0.2 | 0.05 | 0.05 | 0.05 | 0.2 |
| Odor I (*5) | None | None | None | None | None | None | Dist |
| Odor II (*6) | Mod | Mod | Wk | VWk | VWk | Mod | VWk |

(*1): Maximum quantity of limonene which can be dissolved in EVA.
(*2): "Mod": Moderate "IOd": Irritating odor.
(*3): Adhesive strength of polyethylene-laminated PET film.
(*4): Temporary adhesive strength of PET film.
(*5): The degeneration of odor immediately after peeling of PET film. "Dist": Distinct
(*6): Strength of odor, 2 months after the peeling of PET film. "Mod": Moderate; "Wk": Weak; "VWk": Very weak

EXAMPLE 4

A laminated material of Example 4 was prepared by using pyrethroid insect repellent (trademark: Vaporthpolyolefin composition of said laminated material, and (3) pressing the laminated films together, said active agent-containing polyolefin composition comprising:
- (a) 10 to 100 parts by weight of carboxyl group-containing ethylene based copolymer of at least 7% by weight in the content of carboxyl group-containing monomer;
- (b) 90 parts by weight or less of low density polyethylene having a melt index of at least 30 g/10 min.; and
- (c) at least 0.005 parts by weight of an active agent or agents relative to 100 parts by weight of said polymers (a) plus (b).

2. The active agent-containing laminated material in claim 1, wherein said carboxyl group-containing ethylene based copolymer is ethylene-vinyl acetate copolymer or ethylene-ethyl acrylate copolymer.

3. The active agent-containing laminated material in claim 1, wherein said impermeable film is made of at least one material selected from the group consisting of polyamides, polyvinylidene chloride, polyvinyl chloride, saponified product of ethylene-vinyl acetate copolymer, polyester, regenerated cellulose, metal foil and metallized film.

4. The active agent-containing laminated material in claim 1, wherein said active agent is a volatile one.

5. The active agent-containing laminated material in claim 1, wherein said active agent is a perfume.

6. The active agent-containing laminated material in claim 1, wherein said active agent is a deodorant.

7. The active agent-containing laminated material in claim 1, wherein said active agent is an antifungal agent.

8. The active agent-containing laminated material in claim 1, wherein said active agent is a germicide.

9. The active agent-containing laminated material in claim 1, wherein said active agent is an insect repellent.

10. The active agent-containing laminated material in claim 1, wherein said active agent is an insecticide.

11. The active agent-containing laminated material in claim 1, wherein said active agent is a rodenticide.

12. The active agent-containing laminated material in claim 1, wherein said active agent is an animal repellent.

13. The active agent-containing laminated material in claim 1, wherein said active agent is a rust inhibitor.

* * * * *

UNITED STATES PATENT AND TRADEMARK OFFICE
CERTIFICATE OF CORRECTION

PATENT NO. : 4,808,454

DATED : February 28, 1989

INVENTOR(S) : Hachiro Saitoh

It is certified that error appears in the above-identified patent and that said Letters Patent is hereby corrected as shown below:

Column 1, line 58, "of paper" should read --or paper--.

Column 3, line 5, "of less of low" should read --or less of low--

Column 4, line 25, "salicylic cid" should read --salicylic acid--.

Column 6, line 7, "antiseptic an agent" should read --an antiseptic agent--.

Column 7, line 34, "occurs the emisison" should read --occurs causing the emission--.

Column 8, line 43, "peeling and readhered" should read --peeling and readhering--.

Signed and Sealed this

Fourteenth Day of November, 1989

Attest:

JEFFREY M. SAMUELS

*Attesting Officer*     *Acting Commissioner of Patents and Trademarks*